United States Patent
Lin et al.

(10) Patent No.: US 11,912,801 B2
(45) Date of Patent: Feb. 27, 2024

(54) (METH)ACRYLATE URETHANE (UREA) PHOSPHONATES AS ADHESION PROMOTERS

(71) Applicant: 3M INNOVATIVE PROPERTIES COMPANY, St. Paul, MN (US)

(72) Inventors: Ying Lin, Woodbury, MN (US); Sheng Ye, Woodbury, MN (US); Thomas P. Klun, Woodbury, MN (US); Semra Colak Atan, St. Louis Park, MN (US); Jerald K. Rasmussen, Woodville, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 58 days.

(21) Appl. No.: 17/271,134

(22) PCT Filed: Aug. 21, 2019

(86) PCT No.: PCT/US2019/047374
§ 371 (c)(1),
(2) Date: Feb. 24, 2021

(87) PCT Pub. No.: WO2020/046654
PCT Pub. Date: Mar. 5, 2020

(65) Prior Publication Data
US 2021/0253765 A1      Aug. 19, 2021

Related U.S. Application Data

(60) Provisional application No. 62/724,837, filed on Aug. 30, 2018.

(51) Int. Cl.
| | | |
|---|---|---|
| *C08F 222/10* | (2006.01) | |
| *C08F 2/50* | (2006.01) | |
| *C08K 5/08* | (2006.01) | |
| *C08K 5/5313* | (2006.01) | |
| *C08K 5/5393* | (2006.01) | |
| *C08K 5/5397* | (2006.01) | |
| *C09J 4/00* | (2006.01) | |

(52) U.S. Cl.
CPC .......... *C08F 222/1065* (2020.02); *C08F 2/50* (2013.01); *C08K 5/08* (2013.01); *C08K 5/5313* (2013.01); *C08K 5/5393* (2013.01); *C08K 5/5397* (2013.01); *C09J 4/00* (2013.01)

(58) Field of Classification Search
CPC ........ C08F 2/48; C08F 2/50; C08F 222/1065; C08F 230/02; C08F 222/1025; C08F 220/282; C09J 4/00
See application file for complete search history.

(56) References Cited

U.S. PATENT DOCUMENTS

| | | |
|---|---|---|
| 4,304,923 A | 12/1981 | Rousseau |
| 8,372,516 B2 | 2/2013 | Craciun |
| 11,311,462 B2 * | 4/2022 | Kosugi ............... C09J 4/00 |
| 2008/0194730 A1 | 8/2008 | Klee |
| 2009/0075239 A1 | 3/2009 | Abuelyaman |
| 2013/0047887 A1 * | 2/2013 | Trujillo-Lemon ....... A61K 6/78 106/35 |
| 2018/0217035 A1 | 8/2018 | Rasmussen |

FOREIGN PATENT DOCUMENTS

| | | |
|---|---|---|
| JP | 2017007955 A * | 1/2017 |
| WO | WO 2004-060327 | 7/2004 |
| WO | WO 2018-165408 | 9/2018 |

OTHER PUBLICATIONS

Maurya, "A Review on Acrylate-Terminated Urethane Oligomers and Polymers: Synthesis and Applications", A Review on Acrylate-Terminated Urethane Oligomers and Polymers: Synthesis and Applications, Polymer-Plastics Technology and Engineering, 2018, vol. 57, No. 7, pp. 625-656.

Rixens, "Synthesis of New Phosphonated Monomers", Phosphorus, Sulfur, and Silicon and the Related Elements, 2004, vol. 179, No. 12, pp. 2617-2626, XP055635704.

International Search Report for PCT International Application No. PCT/US2019/047374, dated Nov. 26, 2019, 4 pages.

* cited by examiner

*Primary Examiner* — Sanza L. McClendon

(57) ABSTRACT

A curable composition is provided comprising a urethane (meth)acrylate oligomer, a urethane (urea) phosphonate adhesion promoter, optionally reactive diluents, and an initiator. The use of the urethane (urea) phosphonate adhesion promotor provides better ageing stability and adhesion, as measured by T-peel adhesion test, than the use of other conventional adhesion promotors.

14 Claims, No Drawings

(METH)ACRYLATE URETHANE (UREA) PHOSPHONATES AS ADHESION PROMOTERS

CROSS REFERENCE TO RELATED APPLICATIONS

This application is a national stage filing under 35 U.S.C. § 371 of PCT/US2019/047374, filed Aug. 21, 2019, which claims the benefit of Provisional Application No. 62/724,837, filed Aug. 30, 2018, the disclosures of which are incorporated by reference in their entirety herein.

BACKGROUND

There are varieties of known adhesive compositions, the curing of all of which is triggered by curing mechanisms that require a catalyst, moisture and/or heat. It is well known that these curing mechanisms either provide the user with a limited amount of work time because the curing speed is relatively fast; or with a relatively long work time because the curing speed is relatively slow. For example, most one-part compositions have long work time between 10-45 minutes, but cure slowly within hours. Under these circumstances, any sealed parts should wait before further processing, resulting in a loss of efficiency and productivity for the user. In contrast, most two-part compositions can cure as fast as 15 minutes, but may have very short work times.

One of the challenges with light-cure on demand compositions is their cure speed at a given depth of application, especially when a highly filled opaque/colored system is used. To resolve this issue, the compositions of the various embodiments described herein employ a light-emitting curing device that balances the depth of cure and cure speed. Theoretically, longer wavelength light, such as visible light, penetrates deeper than short wavelength light, such as UV. However, short wavelength light has higher energy and more efficiently trigger the initiator, compared with longer wavelength light. In this case, there is a fine balance between depth of cure and cure speed by designing the right wavelength lamp and composition.

U.S. Pat. No. 8,372,516 (Craciun et al.) discloses certain (meth)acrylate phosphonic esters as adhesion promoters, in (meth)acrylate prepolymer compositions.

U.S. Published Application 2008/194730 (Klee et al) discloses self-priming dental adhesive compositions containing phosphonic acid moieties. The composition having adhesion to enamel and/or dentin with a bond strength of at least 8 MPa.

WO 2004/060327 (3M) discloses curable compositions containing one or more polymerizable bisphosphonic acids.

SUMMARY

The present disclosure provides a curable composition comprising a urethane (meth)acrylate oligomer, a urethane (urea) phosphonate adhesion promoter, optionally reactive diluents, and an initiator. The use of the urethane (urea) phosphonate adhesion promotor provides better ageing stability and adhesion, as measured by T-peel, than the use of other conventional adhesion promotors.

Photopolymerizable compositions with excellent adhesion to certain substrates, especially metal surfaces, are provided. These compositions also can have extensive shelf stability and temperature and moisture insensitivity. The polymers produced therefrom are tough and have a long service life. The compositions are useful as sealants that may be cured in place.

The disclosure provides a method of sealing comprising applying the curable composition to a substrate, and initiating polymerization. In some embodiments the substrate can be one or more metal substrates, such as automotive substrates. In some embodiments the initiator is a thermal initiator. In other embodiments the initiator is a photoinitiator, particularly those having an extinction coefficient of from about 10 to about 2000 L/mol. cm at a wavelength from about 400 nm to about 500 nm.

One of the challenges with light-cure on demand compositions is their cure speed at a given depth of application, especially when a highly filled opaque/colored system is used. To resolve this issue, the compositions of some embodiments described herein employ a light-emitting curing device that balances the depth of cure and cure speed. Theoretically, longer wavelength light, such as visible light, penetrates deeper than short wavelength light, such as UV. However, short wavelength light has higher energy and more efficiently trigger the initiator, compared with longer wavelength light. In this case, there is a fine balance between depth of cure and cure speed by designing the right wavelength lamp and composition.

The various embodiments of the described herein may employ "blue wavelength" cure because such light can cure significantly deep applications of the various compositions described herein, even when the compositions are highly filled opaque/colored. The light curing of the various embodiments described herein provides a flexible assembly of different geometries and a high conversion efficiency. This technology provides a "cure on demand" sealant composition so that the sealant has potentially hours of open time and can be cured at any time when exposed to blue light.

In addition, the compositions of the various embodiments described herein can accelerate productivity so that the sealing of parts, such as vehicle parts and the vehicles into which they are incorporated, can be accomplished faster. An additional benefit of the compositions of the various embodiments described herein is that they not only bond strongly to bare metal, but they also do it in a very short period of time, in some instances in less than five seconds while providing a T-peel strength of greater than 2.50 N/mm.

As used herein:
"acryl" is used in a generic sense and mean not only derivatives of acrylic acid, but also amine, thiol and alcohol derivatives, respectively;
"(meth)acryl" includes both acryl and methacryl groups.
"alkyl" and "alkylene" mean the monovalent and divalent residues remaining after removal of one and two hydrogen atoms, respectively, from a linear or branched chain hydrocarbon having 1 to 20 carbon atoms; Unless otherwise restricted, alkyl and alkylene shall be inclusive of cycloalkyl meaning the monovalent and divalent residues remaining after removal of one and two hydrogen atoms, respectively, from a cyclic hydrocarbon having 3 to 12 carbon atoms;
"aryl" and "arylene" mean the monovalent and divalent residues remaining after removal of one and two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$.

"curable" means that a coatable material can be transformed into a solid, substantially non-flowing material by means of cooling (to solidity hot melts), heating (to dry and solidify materials in a solvent), chemical cross linking, radiation crosslinking, or the like.

"Residue" means that part of the original organic molecule remaining after reaction.

DETAILED DESCRIPTION

Adhering a material to certain substrates such as a bare metal substrate without primer in a fast cure system is different from traditional slow cure systems. In a slow cure system, the adhesion promoter molecules have time to diffuse from the bulk matrix to the substrate surface and promote interfacial bonding. In contrast, in a fast cure system, the functional groups of the adhesion promotor may be trapped by the polymer network and thus have limited mobility to access the substrate surface to complete the bonding.

The present disclosure provides curable compositions comprising a polymerizable urethane oligomer, such as a urethane (meth)acrylate and an adhesion promotor comprising a polymerizable phosphonate. More particularly the disclosure provides a curable composition comprising:
a polymerizable multi-functional urethane oligomer (a urethane (meth)acrylate);
optionally a reactive diluent;
an initiator, preferably a photoinitiator; and
an adhesion promoter of the formula:

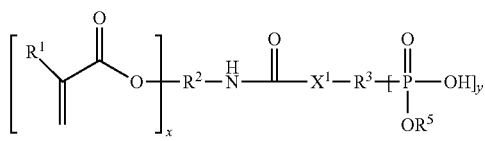

wherein
$R^1$ is H or $C_1$-$C_4$ alkyl
$R^2$ and $R^3$ are each independently a (hetero)hydrocarbyl group;
$R^5$ is H or $C_1$-$C_4$ alkyl;
$X^1$ is -O- or -$NR^4$-, where R4 is H or $C_1$-$C_4$ alkyl,
subscript x is 1 or 2; and
subscript y is 1 or 2.

In some embodiments $R^2$ and $R^3$ may be independently an arylene or an alkylene. In some embodiments the alkylene may have one or more catenary (in-chain) ether oxygen atoms. In other words, $R^2$ and/or $R^3$ may be an ether or polyether group of the formula -$(C_nH_{2n}$-O-$C_mH_{2m}$-$)_a$-$C_oH_{2o}$-, where a is at least one and may be 1-20, each of m, n and o are 1-10, preferably 2-6. It will be understood that the depicted ether structure is difunctionally and higher valences may be shown by abstraction of one or more protons.

The urethane (urea) phosphonates are used in amounts of 1-40 pbw relative to 100 parts by weight (pbw) of the polymerizable components of the composition. In other embodiments the urethane (urea) phosphonates may be used in amounts of 10 to 30 pbw.

Phosphonates of Formula I are preferably prepared by the reaction of a isocyanatoalkyl (meth)acrylate with an amino- or hydroxyl functional phosphonate ester, as shown in Schemel, followed by at least partial dealkylation of the phosphonate ester groups. Exemplary preparations of phosphonic urethane(urea) methacrylates are provided in Rixens, B; Boutevin, G.; Boulahna, A.; Hervaud, Y.; Boutevin, B. Synthesis of New Phosphonated Monomers. Phosphorus, Sulfur, and Silicon and the Related Elements, 179:12, 2617-2626. The phosphonates of Formula I may also be directly prepared by the reaction of the amino or hydroxy functional phosphonic acids or mixed phosphonic acids/esters .

Scheme 1

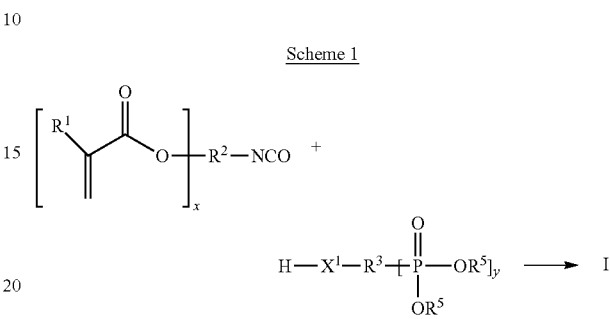

Examples of the isocyanate functional (meth)acrylate include isocyanatoethyl methacrylate, isocyanatoethoxyethyl methacrylate, isocyanatoethyl acrylate, and 1,1-(bisacryloyloxymethyl) ethyl isocyanate, which are for instance commercially available from Showa Denko (Tokyo, Japan). The hydroxy and amino functionalized phosphonic esters may be purchased or made by standard procedures available in the literature.

In some embodiments, the curable composition may further comprise a secondary adhesion promotor in amounts up to an equal weight of the urethane (urea) phosphonate of Formula I. The secondary adhesion promoter may be selected from acrylic acid (AA), methacrylic acid (MAA), beta-carboxyethyl acrylate (β-CEA), 2-hydroxy ethyl methacrylate (HEMA) phosphate; (3-acryloxypropyl)trimethoxysilane, methacryloxypropyltrimethoxysilane, (3-acryloxypropyl)methyldimethoxysilane, (methacryloxymethyl) methyldiethoxysilane, methacryloxypropyldimethylethoxysilane, methacryloxypropyldimethylmethoxysilane, or combinations thereof.

Urethane (meth)acrylates are known as evidenced by Shyam Dev Maurya, et al., (2018) A Review on Acrylate-Terminated Urethane Oligomers and Polymers: Synthesis and Applications, Polymer-Plastics Technology and Engineering, 57:7, 625-656, DOI: 10.1080/03602559.2017.1332764. Useful urethane (meth)acrylates are derived from the reaction of a polyol, a polyisocyanate, then terminated with an ethylenically unsaturated group, typically a (meth)acrylate group.

Useful polymerizable urethane oligomers are of the general formula: (O on structure funky)

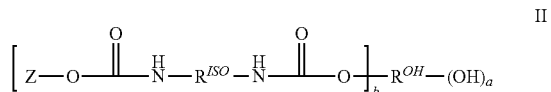

wherein
Z is an ethylenically unsaturated, free radical polymerizable group, preferably selected from (meth)acryloyloxyalkoxy (alternatively named (meth)acryloxyalkoxy), vinylalkoxy, and allyloxy, $R^{ISO}$ is the residue of a polyisocyanate (preferably a diisocyanate) having at least two of its—NCO groups reacted to form a urethane bonding Z to $R^{OH}$, subscript a is 0 or 1, b is and average of greater than one, typically 2-6.

$R^{OH}$ is the residue of a polyol having at least a+b hydroxyl groups and a number average molecular weight between 90 and 10,000, the residue formed by removal of hydrogen from the hydroxyl groups.

The backbone of the oligomer, group $R^{OH}$, may be any aromatic or aliphatic polyol having a molecular weight between 90 and 10,000. The backbone of the oligomer may be any oligomer with the requisite molecular weight and number of hydroxyl groups, but polyesterpolyols and polyoxyalkylene polyols are preferred. Linear oligomeric polyols are useful but the branched or three-dimensional polyols such as polycaprolactone polyols are preferred. The backbone may be prepared by any of the many well-known methods of forming polyhydroxyl substituted oligomers having a molecular weight between 90 and 10,000. The polyols must have a hydroxy equivalent weight of between 45 and 5,000 to be useful according to the present invention. Preferably the polyol has a hydroxy equivalent weight between 90 and 4,000 and most preferably between 200 and 2,000.

The oligomers backbone may be homopolymeric, copolymeric, graft polymeric, or mixtures thereof. For example, polycaprolactone polyols may be used, or lower molecular weight polycaprolactone polyols (average molecular weights of less than, for example, 500) may be joined by polyacids (preferably dicarboxylic acids) or by polyisocyanates (preferably diisocyanates) to form higher molecular weight oligomer backbones.

Frequently the oligomers are prepared by reacting a diisocyanate with a polyester or polyether polyol to yield an isocyanate terminated urethane, which is then reacted with an ethylenically unsaturated compound having an isocyanate-reactive groups to provide the requisite polymerizable group. For example, the isocyanate terminated intermediate may be reacted with a hydroxyalkyl (meth)acrylate.

It is preferred to join the Z-$R^{ISO}$ substituent to the oligomeric backbone $R^{OH}$ by first separately forming an adduct of the polyisocyanate of which $R^{ISO}$ is a residue by reacting one mole of the diisocyanate with one mole of an ethylenically unsaturated free radical polymerizable monomer having one hydroxyl group. The adduct formed is then reacted with a hydroxyl group on the oligomer polyol backbone (the reaction being with an isocyanate group). In an alternative method where the compound with the free radical polymerizable group with one hydroxyl group and the polyisocyanate are added to the oligomeric polyhydroxy backbone before forming the Z-$R^{ISO}$ adduct, the polyisocyanate will act both as a polymer extender for the oligomer and as an adduct former with the free radical containing compound. In such a reaction there would be far less control over the final product and there would be a tendency for the oligomer to gel. Therefore, the free radical polymerizable monomer and the polyisocyanate (preferably diisocyanate) in an independently run synthesis from, for example, an isocyanatoalkylacrylate, isocyanatoalkylmethacrylate, an isocyanato alkyl ether, or isocyanatoalkylvinyl ether adduct.

The adduct (Z-$R^{ISO}$) formed in that step is then caused to react with the polyhydroxy containing backbone so that the remaining isocyanate group of the adduct reacts with some, but not all, of the hydroxyl groups on the oligomer to bond thereto.

Particularly desirable aliphatic polyols from which $R^{OH}$ is formed are polyether polyols, polyester polyols, polylactone polyols, polyolefin polyols, polydiene polyols, polysiloxane polyols, poly(alkylacrylate) polyols, and poly(glycidyl ether) polyols.

In some embodiments $R^{OH}$ is triyl radical which is the residue of an organic polyol with at least three hydroxyl groups removed therefrom and having a molecular weight of from 90 to 10,000, preferably selected from aliphatic triols, tetrols and pentols, poly(oxyalkylene)triols, tetrols and pentols, polyestertriols, tetrols and pentols, polylactonetriols, tetrols and pentols, polyolefintriols, tetrols and pentols, polyacrylatetriols, tetrols and pentols, polyalkylacrylatetriols, tetrols and pentols, and polysiloxanetriols, tetrols and pentols.

Suitable urethane acrylate components for use in the compositions include aliphatic urethane acrylates and aromatic urethane acrylates. In some embodiments, the urethane acrylates can be mono-acrylates or multi-functional urethane acrylates, including di-acrylates, tri-acrylates or mixtures of mono-, di-, and/or tri-acrylates, such that the average functionality is greater than 1.

Examples of suitable urethane acrylates include, but are not limited to oligomers and prepolymers including aliphatic urethane acrylates, commercial examples of which include those from Cytec Surface Specialties under the trademark EBECRYL and designations 244, 264, 265, 284N, 1290, 4833, 4866, 8210, 8301, 8402, 8405, 8807, 5129, and 8411; those available from Sartomer under the designations, CN 973H85, CN 985B88, CN 964, CN 944B85, CN 963B80, CN 973J75, CN 973H85, CN 929, CN 996, CN 966J75, CN 968, CN 980, CN 981, CN 982B88, CN 982B90, CN 983, CN991; CN 2920, CN 2921, CN 2922, CN 9001, CN 9004, CN 9005, CN 9006, CN 9007, CN 9009, CN 9010, CN 9021, CN 9031, CN 9071,CN 9782; GENOMER 4230, 4256 4212, 4215, 4217, 4256, 4267, 4269, 4302, and 4316 and UA available from Rahn; PHOTOMER 6892 and 6008 available from Cognis; NK OLIGO U24A and U-15HA available from Kowa. Additional urethane acrylates include the BR series of aliphatic urethane acrylates such as BR 144 or 970 available from Bomar Specialties or the LAROMER series of aliphatic urethane acrylates such as LAROMER LR 8987 from BASF.

Suitable urethane acrylate components for use in the compositions also include, but are not limited to those known by the trade designations: PHOTOMER (for example, PHOTOMER 6010 from Henkel Corp. of Hoboken, N.J.; EBECRYL (for example, EBECRYL 220 (a hexafunctional aromatic urethane acrylate of molecular weight 1000), EBECRYL 284 (aliphatic urethane diacrylate of 1200 grams/mole molecular weight diluted with 1,6-hexanediol diacrylate), EBECRYL 4827 (aromatic urethane diacrylate of 1600 grams/mole molecular weight), EBECRYL 4830 (aliphatic urethane diacrylate of 1200 grams/mole molecular weight diluted with tetraethylene glycol diacrylate), EBECRYL 6602 (trifunctional aromatic urethane acrylate of 1300 grams/mole molecular weight diluted with trimethylolpropane ethoxy triacrylate), and EBECRYL 840 (aliphatic urethane diacrylate of 1000 grams/mole molecular weight)) from UCB Radcure of Smyrna, Ga.; SARTOMER (for example, SARTOMER 9635, 9645, 9655, 963-B80, and 966-A80) from Sartomer Co., West Chester, Pa.; and UVITHANE (for example, UVITHANE 782) from Morton International, Chicago, Ill.

Suitable urethane acrylate components for use in the compositions also include, but are not limited to aliphatic urethane acrylates available from Miwon, Korea, such as PU2100 (aliphatic urethane diacrylate); Soltech Ltd., Kyoungnam, Korea, such as SU 500 (aliphatic urethane diacrylate with isobornyl acrylate), SU 5020 (aliphatic urethane acrylate with butyl acetate), SU 5030 (aliphatic urethane acrylate with butyl acetate), SU 5039 (nona(9)-functional aliphatic urethane acrylate oligomer), SU 511 (aliphatic urethane diacrylate), SU 512 (aliphatic urethane diacrylate), SU 514 (aliphatic urethane diacrylate with hexane diol diacrylate (HDDA)), SU 591 (aliphatic urethane triacrylate with N-(2-hydroxypropyl) methacrylamide), SU 520 (deca (10)-functional aliphatic urethane acrylate), SU 522 (hexafunctional aliphatic urethane acrylate), SU 5225 (aliphatic urethane diacrylate with isobornyl acrylate), SU 522B (hexa-functional aliphatic urethane acrylate), SU 5260 (aliphatic urethane triacrylate), SU 5270 (aliphatic urethane diacrylate), SU 530 (aliphatic urethane diacrylate), SU 5347 (aliphatic urethane diacrylate), SU 542 (low viscosity aliphatic urethane diacrylate), SU 543 (low viscosity aliphatic urethane diacrylate), SU 564 (aliphatic urethane triacrylate with HDDA), SU 565 (aliphatic urethane triacrylate with tripropylene glycol diacrylate), SU 570 (aliphatic urethane diacrylate), SU 571 (hexa functional aliphatic urethane diacrylate), SU 574 (aliphatic urethane triacrylate with HDDA), SU 574B (aliphatic urethane triacrylate with HDDA), SU 580 (aliphatic urethane diacrylate), SU 584 (aliphatic urethane triacrylate with HDDA), SU 588 (aliphatic urethane triacrylate with 2-(2-ethoxyethoxy)ethyl acrylate), and SU 594 (aliphatic urethane triacrylate with HDDA).

Suitable urethane acrylate components for use in the compositions also include, but are not limited to aromatic urethane acrylates available from Miwon, Korea, such as MU3603 (aromatic urethane diacrylate); Soltech Ltd., Kyoungnam, Korea, such as SU 704 (aromatic urethane triacrylate with HDDA), SU 710 (aromatic urethane diacrylate), SU 720 (hexa-functional aromatic urethane acrylate), and SU 7206 (aromatic urethane triacrylate with trimethylolpropane triacrylate (TMPTA).

The urethane (meth)acrylate component is present in an amount of from about 10 pbw to about 85 pbw, from about 20 pbw to about 50 pbw, from about 20 pbw to about 40 pbw, from about 30 pbw to about 65 pbw, from about 40 pbw to about 50 pbw, from about 45 pbw to about pbw or about from about 50 pbw to about 60 pbw of 100 parts total weight of the polymerizable components of the composition (100 pbw).

In some embodiment the curable composition may include a monofunctional polymerizable urethane oligomer of Formula II wherein subscript "a" is one. Such oligomers may be used in amount up to about 10 pbw relative to the total amount of polymerizable components in the curable composition.

The curable composition may further comprise a reactive diluent. The (meth)acrylate-functional diluents, also referred to herein as "reactive diluents", are relatively low molecular weight mono-functional, aryl or alkyl (meth)acrylate monomers. These relatively low molecular weight reactive diluents are advantageously of a relatively low viscosity, e.g., less than about 1000 centipoise (cps) at 25° C. Preferred reactive diluents include Phenoxy ethyl acrylate (e.g., commercially available as SR-339 from Sartomer), Cumyl phenoxyl ethyl acrylate (e.g., commercially available as CD-590 from Sartomer), o-Phenyl phenoxy ethyl acrylate (e.g., commercially available as Miramer M1142 from Miwon), Phenoxy ethyl methacrylate (e.g., commercially available as SR-340 from Sartomer), isobornyl (meth)acrylate (1130A, Radcure), 2(2-ethoxyethoxy) ethyl (meth)acrylate (sold under the trade name Sartomer 256 from SARTOMER Company, Inc. of Exton, Pa.), benzyl acrylate, tetrahydrofurfuryl (meth)acrylate (Sartomer 285), phenylthio ethyl(meth)acrylate, isooctyl acrylate (e.g., commercially available as SR-440 from Sartomer, Exton, Pa.), isodecyl acrylate (e.g., commercially available as SR-395 from Sartomer), isobornyl acrylate (e.g., commercially available as SR-506 from Sartomer), alkoxylated tetrahydrofurfuryl acrylate (e.g., commercially available as CD-611 from Sartomer) and monofunctional urethane acrylate GENOMER 1122 ($H_2C=CH-C(O)-O-CH_2CH_2O-C(O)NH-CH_2CH_2CH_2CH_3$), commercially available from Rahn USA Corp., Aurora, Ill., USA). Other reactive diluent monomers include, for example, methyl styrene, styrene, and the like.

The reactive diluent is present in an amount of from about 1 pbw to about 50 pbw, about pbw to about 40 pbw, 10 pbw to about 30 pbw based on 100 pbw of the total polymerizable components of the composition.

In some embodiments, the diluent component of the curable composition may include a long chain alkyl (meth)acrylate. Suitable long alkyl chain (meth)acrylates for use in the compositions also include, but are not limited to saturated or unsaturated, substituted or unsubstituted long alkyl chain (meth)acrylates, such as $C_6$-$C_{18}$-acrylates including isooctyl acrylate, stearyl acrylate, and lauryl acrylate; The long alkyl chain (meth)acrylates can be present in an amount of from about 1 pbw to about 10 pbw.

In some embodiments, the diluent component of the curable composition may optionally include multifunctional (di, tri, tetra) (meth)acrylate crosslinking agents containing no urethane functional group as they allow for quicker cure time and increased hardness. Preferred multifunctional reactive diluents include TRIMETHYLOLPROPANE TRIMETHACRYLATE (SR350 from Sartomer), TRIMETHYLOLPROPANE TRIACRYLATE (SR351 from Sartomer), 1,6-hexanediol di(meth)acrylate (HDDA from UCB Radcure, Inc. of Smyrna, Georgia), tripropylene glycol di(meth)acrylate, polyethylene glycol di(meth)acrylate (Sartomer 344), tripropylene glycol di(meth)acrylate (Radcure), neopentyl glycol dialkoxy di(meth)acrylate, polyethyleneglycol di(meth)acrylate, 1,3-butylene glycol diacrylate (e.g., commercially available as SR-212 from Sartomer), 1,6-hexanediol diacrylate (e.g., commercially available as SR-238 from Sartomer), neopentyl glycol diacrylate (e.g., commercially available as SR-247 from Sartomer), and diethylene glycol diacrylate (e.g., commercially available as SR-230 from Sartomer). The multifunctional crosslinker can be present in an amount of from about 0.1 pbw to about 10 pbw, based on 100 pbw of the total polymerizable components of the composition.

The composition may be cured by free radical polymerization of the monomer mixture with a photo- or thermal initiator, using any conventional free radical polymerization method, including solution, radiation, bulk, dispersion, emulsion, solventless, and suspension processes. The resulting adhesive copolymers may be random or block (co) polymers.

Thermal initiators are initiators that, on exposure to heat, generate free-radicals which initiate (co)polymerization of the monomer mixture. Suitable water-soluble initiators include those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). Suitable initiators also include those selected from the group consisting of azo compounds such as VAZO™ 64 (2,2'-azobis(isobutyronitrile)) and VAZO™52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)).

When used, thermal initiators may comprise from about 0.05 to about 1 part by weight, preferably about 0.1 to about 0.5 part by weight based on 100 parts by weight of polymerizable components in the composition.

Useful photoinitiators include benzoin ethers such as benzoin methyl ether and benzoin isopropyl ether; substituted acetophenones such as 2, 2-dimethoxyacetophenone, available as Irgacure™ 651 photoinitiator (BASF, Ludwigshafen, Germany), 2,2 dimethoxy-2-phenyl-l-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

UV light sources can be of two types: 1) relatively low light intensity sources such as backlights which provide generally 10 mW/cm² or less (as measured in accordance with procedures approved by the United States National Institute of Standards and Technology as, for example, with a Uvimap™ 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm², preferably between 15 and 450 mW/cm². For example, an intensity of 600 mW/cm² and an exposure time of about 1 second may be used successfully. Intensities can range from about 0.1 to about 150 mW/cm², preferably from about 0.5 to about 100 mW/cm², and more preferably from about 0.5 to about 50 mW/cm².

One useful class of actinic light sources uses light emitting diodes ("LED"). LED-based UV sources are advantageous because they are capable of generating UV light over a much narrower wavelength range compared with other UV light sources such as black lights and mercury lamps. Such LED sources are commercially available, for example, the AC Series 365nm or 395nm LED Curing Systems available from Excelitas Technologies (Waltham, Mass.).

One of the challenges with light-cure on demand compositions is their cure speed at a given depth of application, especially when a highly filled opaque/colored system is used. To resolve this issue, the compositions of the various embodiments described herein employ a light-emitting curing device that balances the depth of cure and cure speed. Theoretically, longer wavelength light, such as visible light, penetrates deeper than short wavelength light, such as UV. However, short wavelength light has higher energy and more efficiently trigger the initiator, compared with longer wavelength light. In this case, there is a fine balance between depth of cure and cure speed by designing the right wavelength lamp and composition.

Some preferred embodiments employ "blue wavelength" because such light can cure significantly deep applications of the various compositions described herein, even when the compositions are highly filled opaque/colored. The light-emitting curing device of the various embodiments described herein provides a flexible assembly of different geometries and a high conversion efficiency from electricity to radiant energy, which enables the design of cordless battery rechargeable device.

In some preferred embodiments the compositions are cured with a photoinitiator having an extinction coefficient of from about 10 to about 2000 L/mol·cm at a wavelength from about 400 nm to about 500 nm in an amount of from about 0.1 pbw to about 8 pbw based on 100 wt.5 of the polymerizable components of the composition; wherein the composition cures to a depth of cure of up to about 30 mm within about 0.5 second to about two minutes per light exposure area.

Useful initiators in preferred embodiments include quinones, phosphine oxides or phosphinates including those of the formula:

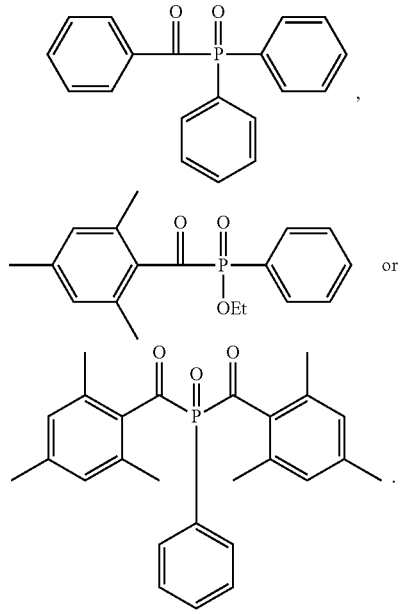

Examples of suitable photoinitiators having absorption at greater than 400 nm for use in the compositions include, but are not limited to quinones, phosphine oxides, phosphinates, mixtures thereof and the like. Photoinitiators include camphorquinone (CPQ), and phosphine oxides available from BASF under LUCIRIN TPO, LUCIRIN TPO-L, LUCIRIN TPO-XL, or IRGACURE 819, IRGACURE 2100 from Ciba, mixtures thereof.

Examples of suitable photoinitiators having absorption at greater than 400 nm for use in the compositions include, but are not limited to quinones, coumarins, phosphine oxides, phosphinates, mixtures thereof and the like. Photoinitiators include camphorquinone (CPQ), and phosphine oxides available from IGM Resins USA Inc. (Charlotte, N.C.) under the OMNIRAD trade designation; specifically, ethyl-2,4,6-trimethylbenzoylphenyl phosphinate (e.g., available as OMNIRAD TPO-L), 2,4,6-trimethylbenzoyl-diphenyl-phosphine oxide (e.g., available as OMNIRAD TPO), and bis-(2,4,6-trimethylbenzoyl)-phenylphosphine oxide (e.g., available as OMNIRAD 819 from IGM Resins USA Inc.).

Photoinitiators having absorption at less than 400 nm (e.g. alpha aminoketones, benzophenones, alpha-hydroxyketones 1-hydroxycyclohexyl-phenylketone) are available from IGM Resins USA Inc. (Charlotte, N.C.)). Examples of photoinitiators that have an absorption less than 400 nm include benzoin ethers such as benzil dimethyl ketal (e.g., available as OMNIRAD 651), benzoin methyl ether, benzoin ethyl ether, benzoin n-butyl ether; acetophenone and its derivatives such as 2-hydroxy-2-methyl-1-phenyl-1-propanone (e.g., available as OMNIRAD 1173), 1-hydroxycyclohexyl phenyl ketone (e.g., available as OMNIRAD 184) and oligo[2-hydroxy-2-methyl-1[4-(1-methylvinyl) phenyl] propanone] (e.g., available as ESACURE KIP 150 or ESACURE ONE); 2-methyl-1-[4-(methylthio)phenyl]-2-(4-morpholinyl)-1-propanone (e.g., available as OMNIRAD 907); 2-benzyl-2-(dimethylamino)-1-[4-(4-morpholinyl)phenyl]-1-butanone (e.g., available as OMNIRAD 369)

The photoinitiator can be present in an amount of about 0.1, about 1, about 2, about 4, about 6, about 8 or about 10 parts by weight or greater based on 100 parts total weight of the polymerizable components of the composition.

Optionally, it is within the scope of this invention to include photosensitizers or photoaccelerators with the photoinitiators. A photosensitizer includes any substance that either increases the rate of photo-initiated polymerization or shifts the wavelength at which polymerization occurs. Typical photosensitizers are monoketones and diketones that absorb some light within a predetermined range; Use of photosensitizers or photoaccelerators alters the wavelength sensitivity of radiation-sensitive compositions employing the initiators used herein. This is particularly advantageous when the photoinitiator does not strongly absorb the incident radiation. Use of photosensitizers or photoaccelerators increases the radiation sensitivity, allowing shorter exposure times and/or use of less powerful sources of radiation.

Examples of suitable additives include, photosensitizers (e.g., camphorquinone, coumarin photosensitizers such as (7-ethoxy-4-methylcoumarin-3-yl)phenyliodonium hexafluoroantimonate, (7-ethoxy-4-methylcoumarin-6-yl)] phenyliodonium hexafluoroantimonate, (7-ethoxy-4-methylcoumarin-3-yl)phenyliodonium hexafluorophosphate, (7-ethoxy-4-methylcoumarin-6-yl)]phenyliodonium hexafluorophosphate, such as those described in Ortyl and Popielarz, Polimery 57: 510-517 (2012), which is incorporated by reference as if fully set forth herein; 1,3-dioxane methyl couramin, such as is described in Yin et al., Journal of Applied Polymer Science 125: 2371-2371 (2012), which is incorporated by reference as if fully set forth herein; coumarin dye; and ketocoumarin dye). Photosensitizers, when present, can be present in an amount of from about 0.0001 pbw to about 5 pbw (e.g., from about 0.0001 pbw to about 0.02 pbw, 0.5 pbw to about 1 pbw, about 1 pbw to about 3 pbw or about 0.05 pbw to about 0.5 pbw).

The curable composition may further include a photobleaching dyes/agents (e.g., Rose Bengal, Methylene Violet, Methylene Blue, Fluorescein, Eosin Yellow, 65 Eosin Y, Ethyl Eosin, Eosin bluish, Eosin B, Erythrosin B, Erythrosin Yellowish Blend, Toluidine Blue, Disperse blue 60, oil blue A, 4',5'- Dibromofluorescein and blends thereof). Photobleaching dyes/agents, when present, can be present in an amount of from about 0.0001 pbw to about 5 pbw (e.g., from about 0.0001 pbw to about 0.02 pbw, 0.5 pbw to about 1 pbw, about 1 pbw to about 3 pbw or about 0.05 pbw to about 0.5 pbw).

The curable compositions can be polymerized/cured by any suitable method, including photochemically. In one embodiment, the compositions of the various embodiments described herein can be polymerized/cured using a light-emitting curing device emitting light at a wavelength of from about 260 nm to about 550 nm (e.g., from about 400 nm to about 500 nm; about 425 nm to about 475 nm; or about 440 nm to about 460 nm) and having a radiometric energy of about at least about 0.1 W/cm$^2$ (e.g., about 0.5 W/cm$^2$ to about 5 W/cm$^2$; about 1 W/cm$^2$ to about 3 W/cm$^2$; about 1 W/cm$^2$ to about 2 W/cm$^2$; or about 0.5 W/cm$^2$ to about 2 W/cm$^2$).

It should be understood that any suitable light-emitting curing device emitting light at a wavelength of from about 260 nm to about 550 nm and having a radiometric energy of about at least about 0.1 W/cm$^2$ can be used to polymerize/cure the compositions of the various embodiments described herein. In some embodiments, a suitable light-emitting curing device can use light emitting diodes (LEDs), but need not be limited to light-emitting curing devices based on LEDs. But any suitable source of light of wavelength of from about 260 nm to about 550 nm and having a radiometric energy of about at least about 0.1 W/cm$^2$ can be used.

The composition may optionally include reinforcing silicas, such as fused or fumed silicas, and may be untreated or treated so as to alter the chemical nature of their surface. Virtually any reinforcing fused or fumed silica may be used. Examples of such treated fumed silicas include polydimethylsiloxane-treated silicas, hexamethyldisilazane-treated silicas and surface treated by alkyltrimethoxysilanes such as hexyl (C6), octyl (C8), decyl (C10), hexadecyl (C16), and octadecyl (C18) trimethoxysilanes. Such treated silicas are commercially available, such as from Cabot Corporation under the tradename CAB-O-SIL ND-TS, such as CAB-O-SIL TS 720, 710, 610, 530 and Degussa Corporation under the tradename AEROSIL, such as AEROSIL R805.

Of the untreated silicas, amorphous and hydrous silicas may be used. For instance, commercially available amorphous silicas include AEROSIL 300 with an average particle size of the primary particles of about 7 nm, AEROSIL 200 with an average particle size of the primary particles of about 12 nm, AEROSIL 130 with an average size of the primary particles of about 16 nm; and commercially available hydrous silicas include NIPSIL E150 with an average particle size of 4.5 nm, NIPSIL E200A With and average particle size of 2.0 nm, and NIPSIL E220A with an average particle size of 1.0 nm (manufactured by Japan Silica Kogya Inc.).

Such silicas may be used in amounts of 1 to 50 pbw, relative to 100 pbw of the polymerizable components of the composition. Alternatively, the silica is used in amount to provide a predetermined viscosity. For example, the silica may be added in amounts to achieve a viscosity such that the composition is self-wetting, i.e. freely flowing on the surface of the substrate and filling voids. The silica may be added in amount such that the composition is sprayable. Finally, the silica may be added in amounts such that the composition forms a caulk for filling spaces, voids or interstices of substrates.

Polymerizable compositions are often stabilized by the addition of inhibitors to prevent polymerization initiation by light, heat and air. For example, stable radical compounds which can trap free radicals are used to inhibit radical polymerization. Such as 4-tert-butylpyrocatechol, tert-butylhydroquinone, 1,4-benzoquinone, 6-tert-butyl-2,4-xylenol, dibutylhydroxytoluene, 2,6-Di-tert-butylphenol, 1,1-Diphenyl-2-picrylhydrazyl, hydroquinone, 4-methoxyphenol, phenothiazine, N-oxy hindered amine esters, such as 2,2,6, 6-Tetramethylpiperidine 1-oxyl (TEMPO), and 4-Hydroxy-TEMPO. Radical inhibitor, when present, can be present in an amount of from about 0.01 pbw to about 1 pbw relative of 100 pbw of the polymerizable components of the composition.

The curable compositions may optionally include a corrosion inhibitor. Examples include primary, secondary and tertiary aliphatic amines; aliphatic diamines; cycloaliphatic and aromatic amines; polymethylimines; long alkyl chain ethanolamines; imidazolines; amine-epoxy adduct solids, such as FXR1020, Ancamine 2442, FXR 1080, amine salts of an aromatic sulfonic acid, NACORR 1754, for example those of carbonic, carbamic, acetic, benzoic, oleic, nitrous and chromic acids; acetylenic alcohols; lauric alcohol; alkyl chromates; organic esters of nitrous acid; organic esters of phthalic acid; organic esters of carbonic acid; nitronaphthalene; nitrobenzene; amides; mixtures of nitrites with urea, urotropine, or ethanolamines; naphthols; thiourea derivatives; heterocyclic compounds such as benzotriazole, tolyltriazole, mercaptobenzothiazole and their respective salts; nitrated or sulfonated petroleum derivatives; and Zinc phosphate complex LUBRIZOL 219, dodecenyl succinic acid LUBRIZOL 541). Corrosion inhibitors, when present, can be present in an amount of from about 0.5 pbw to about 10 pbw relative of 100 pbw of the polymerizable components of the composition (e.g., from about 1 pbw to about 5 pbw).

The curable compositions may optionally include a photobleachable dye as curing indicator. Examples include a photobleachable dye selected from the group consisting of aminoanthraquinone dyes, azo dyes, and combinations thereof; For example, disperse blue 6, REACTINT BLUE X17AB, ethyl eosin, methylene blue. Photobleachable dye, when present, can be present in an amount of from about 0.0001 pbw to about 0.01 pbw relative of 100 pbw of the polymerizable components of the composition.

Other suitable additives include, pigments, surfactants, fire retardants, masking agents, and combinations of any of the foregoing. When used, the additives may be present in a composition in an amount ranging, for example, from about 0% to 20% by weight.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Mo., or may be synthesized by known methods. Table 1 (below) lists materials used in the examples and their sources.

TABLE 1

Materials List

| Name | DESCRIPTION | SOURCE |
|---|---|---|
| BEI | 1,1-bis(acryloyloxymethyl) ethyl isocyanate; acrylated material with isocyanate functionality | CBC America Corp., Commack, NY, USA |
| IEA | 2-Isocyanatoethyl acrylate; acrylated material with isocyanate functionality | CBC America Corp. |
| IEM | 2-Isocyanatoethyl methacrylate; methacrylated material with isocyanate functionality | CBC America Corp. |
| IEM-EO | 2-[2-(methacryloyloxy)ethyloxy]ethyl isocyanate, CAS number 107023-60-9; methacrylated material with isocyanate functionality | CBC America Corp |
| DBTDL | Dibutyltin dilaurate; catalyst | Sigma-Aldrich Corp., St. Louis, MO, USA |
| DMHEP | Dimethyl (2-hydroxyethyl) phosphonate; phosphonate ester | TCI America, Portland, OR, USA |
| $CH_2Cl_2$ | Methylene chloride; solvent | EMD Chemicals, Inc., Billerica, MA, USA |
| MeOH | Methanol; solvent/reagent | EMD Chemicals, Inc. |
| 4-hydroxy TEMPO | 4-Hydroxy-2,2,6,6-tetramethylpiperidine 1-oxyl; radical stabilizer | Sigma-Aldrich Corp. |
| MEHQ | 4-methoxy phenol; radical stabilizer | Sigma-Aldrich Corp. |
| BTMS | Bromotrimethylsilane; phosphonic ester demethylation reagent | Oakwood Chemical, Estill, SC, USA |
| CN973H85 | An aromatic polyester based urethane diacrylate oligomer blended with 15% SR256, 2(2-ethoxyethoxy) ethyl acrylate available under the trade designation CN973H85 | Sartomer, Exton, PA, USA |

TABLE 1-continued

Materials List

| Name | DESCRIPTION | SOURCE |
| --- | --- | --- |
| CN9071 | An aliphatic urethane acrylate oligomer available under the trade designation CN9071 | Sartomer, Exton, PA, USA |
| I819 | Photoinitiator obtained under the trade designation IRGACURE 819 | BASF, Ludwigshafen, Germany |
| CTS-720 | Fumed silica filler obtained under the trade designation CABOSIL TS-720 | Cabot Corp., Boston, MA, USA |
| G1122 | Urethane monoacrylate resin obtained under the trade designation GENOMER 1122 | Rahn USA Corp., Aurora, IL, USA |
| NAM-PM21 | Caprolactone-Modified 2-hydroxyethyl methacrylate Phosphate; adhesion promoter | Nagase America Corp., New York, NY, USA |
| HEMAP | 2-hydroxy ethyl methacrylate (HEMA) phosphate; adhesion promoter | Sigma-Aldrich Corp. |
| | Aminomethyl phosphonic acid | Sigma-Aldrich Corp |
| NaOH | Sodium hydroxide | Alfa Aesar, Ward Hill, MA |
| Glypho | Esterification product of 2-hydroxypropane-1,3-diyl-bis(2-methylprop-2-enoate) and 3-hydroxypropane-1,2-diyl-bis(2-methylprop-2-enoate) and diphosphorus pentoxide" (taken from the European dossier public record, EC number: 700-757-3; adhesion promoter | |
| APA | 2-acryoloxyethyl phosphonic acid, prepared as described below. | |
| BTA | Benzotriazole; corrosion inhibitor | Sigma-Aldrich Corp. |
| UAPA-1 | Urethane acrylate phosphonic acid 1, prepared as described below. | |
| UMAPA-2 | Urethane methacrylate phosphonic acid 2, prepared as described below. | |
| UAPA-3 | Urethane diacrylate phosphonic acid 3, prepared as described below. | |

TABLE 1-continued

Materials List

| Name | DESCRIPTION | SOURCE |
|---|---|---|
| UMAPA-4 | Urethane methacrylate phosphonic acid 4, prepared as described below. | |

[Chemical structure of UMAPA-4: methacrylate-O-CH2CH2-O-CH2CH2-NH-C(=O)-O-CH2CH2-P(=O)(OH)2]

UMAPA-5  Urea methacrylate phosphonic acid 4, prepared as described below.

[Chemical structure of UMAPA-5: methacrylate-O-CH2CH2-NH-C(=O)-NH-CH2-P(=O)(OH)2]

Test Methods and Materials Preparation

T-PEEL MEASUREMENT TEST METHOD

The T-peel test was used to quantitatively measure the adhesion to bare metal (Cold rolled steel, type 1018, 20 gauge thickness). A 0.3 inch ×3 inch (0.76 centimeters (cm) ×7.6 cm) T-peel specimen was abraded, washed with isopropyl alcohol (IPA) and air dried immediately before applying the curing compositions. The mixture was cured from both sides of the T-peel specimen for 30 seconds by using light-emitting curing device (CF2000, obtained from Clearstone Technologies Inc., Hopkins, Minn., USA) at 100% power and placed approximately 10 millimeters away to cure the mixture. A 180 degree peel test was done using an Instron tester (Norwood, Mass., USA) at 2.0 inch/minute (5.08 centimeter/minute) speed. Data was reported as Peel strength in Newtons per millimeter (N/mm) and peak load in Newtons (N). Five specimens for each sample were carried out to get the average value and standard deviation (SD) value.

CORROSION MEASUREMENT TEST METHOD

To evaluate corrosion resistance properties, an accelerated corrosion test was performed according to ASTM B117. Cure-on-demand materials were coated on fresh abraded cold-rolled steel panels at a thickness of 50 mils (1270 micrometers) and cured by using a light-emitting curing device (CF2000, obtained from Clearstone Technologies Inc.) at 100% power for 5 seconds and placed approximately 10 millimeters away to cure the mixture. 2 part epoxy resin (DP401LV/DP90LV in 2/1 ratio, PPG) was touched up with a paintbrush to seal the edges. The corrosion test was done by salt spray exposure in an aqueous 5 weight percent (pbw) sodium chloride solution, supplied with an air-sparging system for 3 weeks. After 3 weeks, samples were removed, and the degree of rust was evaluated. Results are presented in Table 4 below, wherein corrosion was evaluated by visual inspection, and was rated as follows:

5 = 0% or close to zero after 3 weeks salt spray test;

4 = about 10% corrosion after 3 weeks salt spray test;

3 = about 30% corrosion after 3 weeks salt spray test;

2 = about 50% corrosion after 3 weeks salt spray test; and

1 = more than about 70% corrosion after 3 weeks salt spray test.

A value of 3, 4 or 5 indicates "passing."

AGING TEST METHOD

The curable composition packed in a plastic jar was aged at 120° F. (49° C.) for 2 weeks. The adhesion of the aged curable composition was evaluated by T-peel test as described above. The corrosion resistance of the aged curable composition was evaluated by corrosion measurement test method as described above.

PREPARATION OF URETHANE ACYLATE PHOSPHONIC ACID 1: UAPA-1

Step 1. Urethane formation

A 3-necked 100 milliliter (mL) round bottom flask equipped with a stirbar and internal temperature probe was charged with 19.44 grams (g) DMHEP (0.126 mole (mol), 154.1 molecular weight in g/mole (MW)) and 0.02 g DBTDL (500 parts per million (ppm)) and placed under dry air into a room temperature (RT) oil bath. Via a pressure equalizing funnel, 18.98 g IEA (0.135 mol, 141.12 equivalent weight in grams per equivalent (EW)) was added over 18 minutes with the reaction temperature rising from 21.6° C. to 43.1° C. at 38 minutes. At 1 hour 18 minutes the reaction temperature was 29.3° C., and the reaction was heated to 55° C. The reaction was monitored by Fourier-transform infrared spectroscopy (FTIR) and at 4 hours 40 minutes, an aliquot showed a small—NCO peak at 2265 cm$^{-1}$, and 0.26 g of DMHEP was added. At 5 hours 40 minutes an aliquot showed a smaller—NCO peak at 2265 cm$^{-1}$, and 0.24 g more DMHEP was added. At 6 hours 40 minutes the reaction showed no NCO peak at 2265 cm$^{-1}$ and the urethane from Step 1 was isolated and characterized by $^1$H NMR.

Step 2. Demethylation to phosphonic acid

To a 3 necked 100 mL round bottom flask equipped with still-head, condenser, and receiver flask was charged 18.20 g of the urethane from Step 1 (0.0616 mol, 295.22 MW) and 36.4 g CH$_2$Cl$_2$. Via a pressure equalizing funnel, 18.87 g BTMS was added (0.123 mol, 153.1 MW) over 30 minutes. The reaction was then heated to reflux for 1 hour with distillation of methyl bromide. The material was concentrated by rotary evaporation at 50° C. under aspirator pressure to remove the CH$_2$Cl$_2$. The material was dissolved in 40 g MeOH and stirred for 1.5 hours at RT. To this mixture was added 0.019 g MEHQ and 0.005 4-hydroxy TEMPO, which was concentrated by rotary evaporation at 50° C. under aspirator pressure, and then under vacuum at 3 torr for 1 hour to yield the material as a thick clear oil which was characterized by $^1$H NMR.

PREPARATION OF URETHANE (METH)ACYLATE PHOSPHONIC ACID 2: UMAPA-2

Step 1. Urethane formation.

In a method similar to that for Step 1 of UMAPA-1, 20.03 g DMHEP (0.130 mol, 154.1 MW), 0.02 g DBTDL (500 ppm), and 20.97 g IEM (0.135 mol, 155.15 MW) were reacted to form the urethane.

Step 2. Demethylation to phosphonic acid

In a method similar to that for Step 2 of UMAPA-1, 20.00 g of the urethane generated in Step 1 (0.0647 mol, 309.25 MW), in 40 g of $CH_2Cl_2$ was reacted with 19.80 g BTMS (0.129 mol, 153.1 MW), concentrated, dissolved in 40 g MeOH with 0.020 g MEHQ and 0.005 g 4-hydroxy TEMPO, reacted and concentrated to provide UMAPA-2.

PREPARATION OF URETHANE DIACRYLATE PHOSPHONIC ACID 3: UAPA-3

Step 1. Urethane formation.

In a method similar to that for Step 1 of UMAPA-1, 15.68 g DMHEP (0.1017 mol, 154.1 MW), 0.02 g DBTDL (500 ppm), and 25.31 g BEI (0.1058 mol, 239.23 MW) were reacted to form the urethane.

Step 2. Demethylation to phosphonic acid

In a method similar to that for Step 2 of UMAPA-1, 20.00 g of the urethane generated in Step 1 (0.0508 mol, 393.33 MW), in 40 g of $CH_2Cl_2$ was reacted with 15.57 g BTMS (0.1016 mol, 153.1 MW), concentrated, dissolved in 40 g MeOH with 0.020 g MEHQ and 0.005 g 4-hydroxy TEMPO, reacted and concentrated to provide UMAPA-3.

PREPARATION OF URETHANE METHACRYLATE PHOSPHONIC ACID 4: UMAPA-4

Step 1. Urethane formation.

In a method similar to that for Step 1 of UAPA-1, 10.00 g DMHEP (0.06489 mol, 154.1 MW), 0.02 g XK-671 (500 ppm), and 12.93 g IEM-EO (0.06489 mol, 199.2 MW) were reacted to form the urethane.

Step 2. Demethylation to phosphonic acid

In a method similar to that for Step 2 of UAPA-1, 22.77 g of the urethane generated in Step 1 (0.06489 mol, 353.3 MW), in 45.54 g of $CH_2Cl_2$ was reacted with 20.72 g BTMS (0.1353 mol,153.1 MW), concentrated, dissolved in 80 g MeOH with 0.022 g BHT and 0.045 g 4-hydroxy TEMPO, reacted and concentrated to provide UMAPA-4, a thick oil.

PREPARATION OF UREA METHACRYLATE PHOSPHONIC ACID: UMAPA-5

A 500 mL round bottom flask was charged with 400ml of 1N sodium hydroxide which was cooled in an ice bath. Next 22.2 g Aminomethyl phosphonic acid (0.2 mol, 111.04 MW), was dissolved in the sodium hydroxide solution over 30 minutes. Then 31.03 g IEM (0.2 mol, 155.15 MW) was added and allowed to stir for 30 minutes at 10° C. and 60 min at room temperature until the reaction was homogeneous and clear.

The pH of 150 mL aliquot of the reaction was adjusted to pH=2 by addition of concentrated hydrochloric acid. The acidified reaction mixture was lyophilized to remove excess water and a white solid was isolated. The white solid was dispersed in tetrahydrofuran, filtered, washed with excess diethyl ether and dried under vacuum. The pH of 150 mL aliquot of the reaction was adjusted to pH=2 by addition of concentrated hydrochloric acid. The acidified reaction mixture was lyophilized to remove excess water and a white solid was isolated. The white solid was dispersed in tetrahydrofuran, filtered, washed with excess diethyl ether and dried under vacuum.

PREPARATION OF 2-ACRYOLOXYETHYL PHOSPHONIC ACID (APA)

Step 1. Acrylation of DMHEP.

A 100 mL round bottom flask was charged with 8.07 g DMHEP (0.0388 mol, 154.1 MW), 7.88 g TEA (0.0779 mol, 101.19 MW), and 49.27 g $CH_2Cl_2$. Then 6.75 g acryloyl chloride (0.0746 mol, 90.51 MW) was added at room temperature over 15 minutes. After reaction overnight, 50 g more $CH_2Cl_2$ was added to the reaction which was then stirred with 5 g of 0.1 N HCl for 35 minutes, followed by separation of the layers. The lower layer was then stirred with 70 g water and 80 g 1N HCl. The layers were separated and the lower layer, an emulsion, was dried with enough anhydrous magnesium sulfate to provide a clear layer. The mixture was filtered and was concentrated by rotary evaporation at 50° C. under aspirator pressure, and then under vacuum at 3 torr to provide 8.07 g for the next step.

Step 2. Demethylation to phosphonic acid

In a method similar to that for Step 2 of UAPA-1, 8.07 g of the material generated in Step 1 (0.00.0389 mol, 208.11 MW), in 16.14 g of $CH_2Cl_2$ was reacted with 12.76 g BTMS (0.0833 mol, 153.1 MW), concentrated, dissolved in 80 g MeOH with 0.010 g BHT and 0.0016 g 4-hydroxy TEMPO, reacted and concentrated to provide the product as a thick oil.

Examples

EXAMPLES 1 to 5 (EX-1 to EX-5) AND COMPARATIVE EXAMPLES 1 to 4 (CE-1 to CE-4)

Examples were prepared by combining the reagents and amounts as listed in Table 2, below, where the amounts of each component are given in parts by weight (in grams). Samples was made by charging an amber glass jar with the components listed in specific examples, minus the CABO-SIL TS-720 (silica) filler. The amber glass jar was heated on a hot roller at 70° C. until the components were substantially dissolved or dispersed homogeneously. The warm mixture was transferred to an opaque plastic speed mixer jar, where upon the CABOSIL TS-720 was added to it.

TABLE 2

| Formulations | | | | | | | | | |
|---|---|---|---|---|---|---|---|---|---|
| | EXAMPLE | | | | | | | | |
| | EX-1 | EX-2 | EX-3 | EX-4 | EX-5 | CE-1 | CE-2 | CE-3 | CE-4 |
| CN973H85 | 27 | 27 | 27 | 27 | | 27 | 27 | 27 | 27 |
| CN9071 | | | | | 27 | | | | |
| G1122 | 36 | 36 | 36 | 36 | 36 | 36 | 36 | 36 | 36 |
| UAPA-1 | 27 | | | | | | | | |
| UMAPA-2 | | 27 | | | | | | | |
| UAPA-3 | | | 27 | | | | | | |
| UMAPA-4 | | | | 27 | | | | | |
| UMAPA-5 | | | | | 27 | | | | |
| HEMAP | | | | | | 27 | | | |
| Glypho | | | | | | | 27 | | |
| NAM-PM21 | | | | | | | | 27 | |
| APA | | | | | | | | | 27 |
| I819 | 4 | 4 | 4 | 4 | 4 | 4 | 4 | 4 | 4 |
| CTS-720 | 4 | 4 | 4 | 4 | 4 | 4 | 4 | 4 | 4 |
| BTA | 2 | 2 | 2 | 2 | 2 | 2 | 2 | 2 | 2 |

TABLE 3

| | Adhesion performance | |
|---|---|---|
| EXAMPLE | T-peel strength initial, N/mm | T-peel strength after aging, N/mm |
| EX-1 | 3.45 ± 0.79 | 6.96 ± 0.58 |
| EX-2 | 5.12 ± 0.27 | 3.02 ± 0.03 |
| EX-3 | 2.18 ± 0.05 | 2.78 ± 0.16 |
| EX-4 | 8.06 ± 0.28 | 5.66 ± 0.32 |
| EX-5 | 10.16 ± 0.08 | 7.63 ± 0.84 |
| CE-1 | 4.77 ± 0.19 | 2.14 ± 0.12 |
| CE-2 | 1.87 ± 0.03 | 1.47 ± 0.18 |
| CE-3 | 3.90 ± 0.09 | 2.77 ± 0.06 |
| CE-4 | 1.24 ± 0.59 | 1.09 ± 0.43 |

TABLE 4

| | Corrosion performance | |
|---|---|---|
| EXAMPLE | Corrosion rating before aging | Corrosion rating after aging |
| EX-1 | 5 | 5 |
| EX-3 | 5 | 5 |
| CE-1 | 5 | 2 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising:
   a multifunctional urethane (meth)acrylate oligomer, wherein the multifunctional urethane (meth)acrylate oligomer is of the general formula:

II

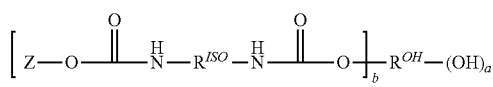

wherein

Z is an ethylenically unsaturated, free radical polymerizable group, $R^{ISO}$ is the residue of a polyisocyanate having at least two of its—NCO groups reacted to form a urethane bonding Z to $R^{OH}$, subscript a is 0 or 1, b is 2-6, and $R^{OH}$ is the residue of a polyol having at least a+b hydroxyl groups and a number average molecular weight between 90 and 10,000, the residue formed by removal of hydrogen from the hydroxyl groups;

optionally a reactive diluent;

an initiator;

a multifunctional (meth)acrylate crosslinker containing no urethane functional groups; and an adhesion promoter of the formula:

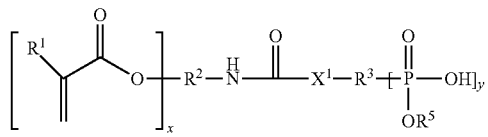

wherein
   $R^1$ is H or $C_1$-$C_4$ alkyl
   $R^2$ and $R^3$ are each independently a (hetero)hydrocarbyl group;
   $R^5$ is H or $C_1$-$C_4$ alkyl;
   $X^1$ is -O- or -$NR^4$-, where $R^4$ is H or $C_1$-$C_4$ alkyl,
   subscript x is 1 or 2; and
   subscript y is 1 or 2;
      wherein the curable composition comprises 0.1 pbw to about 10 pbw of the multifunctional (meth)acrylate crosslinker based on 100 pbw of the total polymerizable components of the composition.

2. The curable composition of claim 1 further comprising a reactive diluent.

3. The curable composition of claim 1 comprising:
   a) 10 pbw to about 85 pbw urethane (meth)acrylate oligomer;
   b) 1 pbw to about 50 pbw reactive diluent;
   c) 1-40 pbw of said adhesion promotor,
   wherein the sum of the polymerizable component is 100 pbw.

4. The curable composition of claim 3 comprising 10 to 40 pbw reactive diluent.

5. The curable composition of claim 3, wherein the initiator comprises a photoinitiator and the curable composition comprises 0.1 pbw to about 8 pbw of the photoinitiator.

6. The curable composition of claim 5 wherein the photoinitiator has an extinction coefficient of from about 10 to about 2000 L/mol. cm at a wavelength from about 400 nm to about 500 nm.

7. The curable composition of claim 5, wherein the photoinitiator comprises

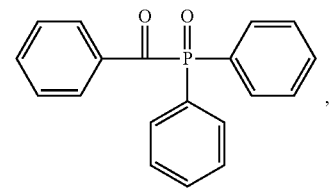

,

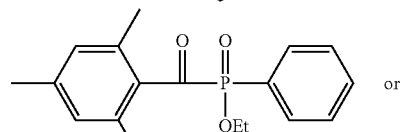 or

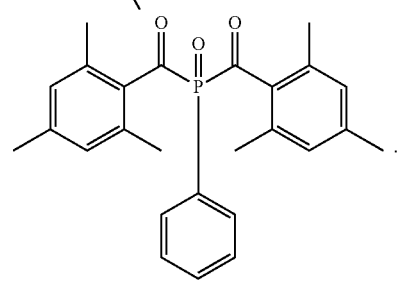

.

8. The curable composition of claim 5 further comprising a photosensitizer.

9. The curable composition of claim 8 wherein the photosensitizer comprises camphorquinone.

10. The curable composition of claim 1, wherein the reactive diluent is a low viscosity (meth)acrylate monomer.

11. The curable composition of claim 1, wherein the curable composition further comprises about 0.5 to about 10 pbw corrosion inhibitor.

12. The curable composition of claim 1, further comprising a photobleachable dye as curing indicator.

13. The curable composition of claim 1, further comprising a radical stabilizer.

14. The curable composition of claim 1, further comprising a rheology modifier.

* * * * *